April 17, 1962  W. H. PRICE  3,029,700
VARIABLE MAGNIFICATION AFOCAL LENS CONVERTER
Filed Nov. 25, 1959
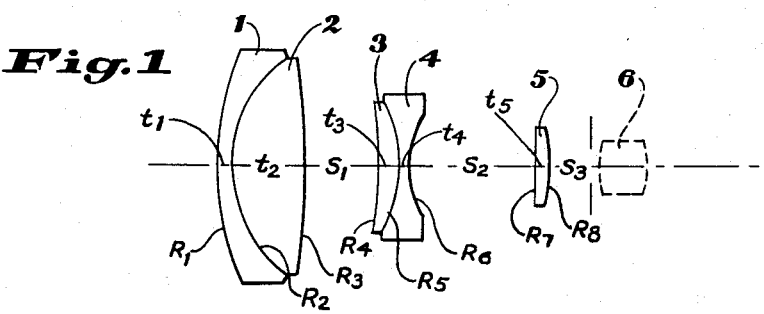
Fig. 1
| LENS | N | V | RADII | THICKNESSES |
|---|---|---|---|---|
| 1 | 1.720 | 29.3 | $R_1 = +42.22$ mm | $t_1 = 2.00$ mm |
| 2 | 1.616 | 49.5 | $R_2 = +20.40$ | $t_2 = 12.01$ |
|   |       |      | $R_3 = -215.7$ | $S_1$ VARIES |
| 3 | 1.720 | 29.3 | $R_4 = -200.0$ | $t_3 = 3.30$ |
| 4 | 1.697 | 56.2 | $R_5 = -25.00$ | $t_4 = 2.00$ |
|   |       |      | $R_6 = +16.70$ | $S_2$ VARIES |
| 5 | 1.511 | 63.5 | $R_7 = \infty$ | $t_5 = 2.00$ |
|   |       |      | $R_8 = -34.04$ | $S_3$ VARIES |
Fig. 2
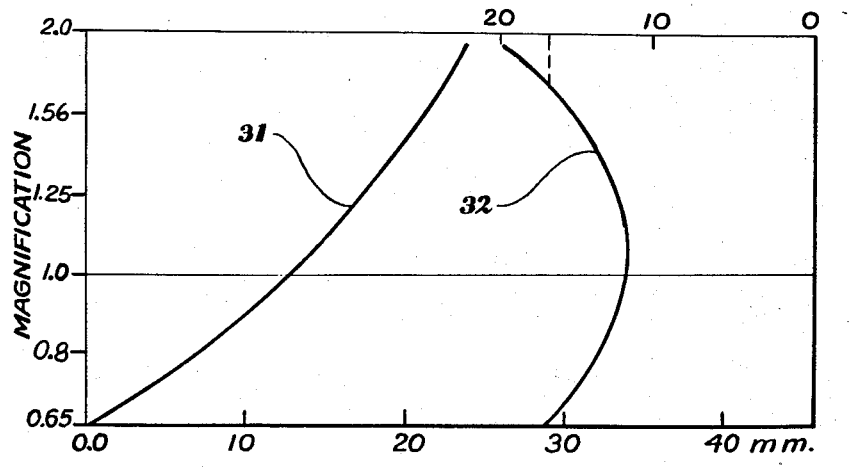
Fig. 3
William H. Price
INVENTOR.
BY R. Frank Smith
F. M. Emerson Holmes
ATTORNEYS

United States Patent Office 3,029,700
Patented Apr. 17, 1962

3,029,700
VARIABLE MAGNIFICATION AFOCAL LENS CONVERTER
William H. Price, Rochester, N.Y., assignor to Eastman Kodak Company, Rochester, N.Y., a corporation of New Jersey
Filed Nov. 25, 1959, Ser. No. 855,429
3 Claims. (Cl. 88—57)

This invention relates to photographic lenses and particularly to variable focal length, or zoom, lenses. The object of this invention is to provide an afocal lens converter or pancratic lens attachment for use with photographic objectives, covering maximum field of ±18° (i.e. at wide angle setting) and variable from a magnification of 0.65 to 1.9, and capable of maintaining the position of the focal plane and a high degree of correction of the aberrations throughout this range of variation.

In some embodiments of the invention, the attachment is not strictly "afocal." It accepts light diverging from the "fixed focus" distance of the objective and transmits it to the objective with the same divergence. Parallel incident light may not be quite parallel when it emerges from such an attachment but it will be so nearly so that it is customary to refer to all such attachments as afocal.

According to the invention a zoom converter attachment is made up comprising a front positive component, a negative component behind it and a positive component behind the negative component, all in axial alignment, in which the front two components each consist of two lens elements cemented together and the rear component consists of a simple positive element. One of the components is fixed relative to the main lens with which the attachment is to be used and the other two are axially movable and mechanically coupled, so as to maintain the afocal condition throughout the zoom. The refractive indices N of the lens element for the D line of the spectrum, the dispersive indices V, and the radii R of the optical surfaces, each numbered by subscripts in order from front to rear, are within the ranges defined in the following table of algebraic inequalities:

| | |
|---|---|
| $1.67 < N_1 < 1.77$ | $0.58L < R_1 < 1.12L$ |
| $0.5V_2 < V_1 < 0.7V_2$ | $0.31L < R_2 < 0.44L$ |
| $1.57 < N_2 < 1.67$ | $-0.66 < \frac{L}{R_3} < 0$ |
| $40 < V_2 < 65$ | |
| $1.67 < N_3 < 1.77$ | $-0.69 < \frac{L}{R_4} < 0$ |
| $0.4V_4 < V_3 < 0.6V_4$ | $0.38L < -R_5 < 0.56L$ |
| $1.65 < N_4 < 1.75$ | $0.27L < +R_6 < 0.34L$ |
| $45 < V_4 < 65$ | |
| $1.46 < N_5 < 1.56$ | $-0.41 < \frac{L}{R_7} < +0.41$ |
| $55 < V_5 < 100$ | $0.48L < -R_8 < 0.83L$ |

Here L is the length of the converter from the front lens surface of the first component to the rear lens surface of the last component when the converter is set for unit magnification; this over-all length must be used as the standard of measurement because the converter has no definite focal length, being "afocal." The movable lens components are mounted for axial movement according to known optical laws so that the front airspace increases continuously as the magnification is increased and the sum of the two airspaces increases from the low magnification position to about the middle of the range and decreases again from the middle to the high magnification end of the range, causing the zoom converter to remain substantially afocal at all adjustments with the range.

The thicknesses of the elements are not critical except that they must be thick enough to be manufacturable and not so thick as to interfere with the movement of the components, i.e. not so thick as to occupy all of the available airspace at any one setting. The airspaces are varied to provide the zoom action.

In the accompanying drawings:
FIG. 1 is a diagrammatic axial section of a zoom converter according to the invention;
FIG. 2 is a table of specifications for a specific example thereof, and
FIG. 3 is a graph showing the spacing of the two movable members during zooming.

In FIG. 1 the afocal zoom converter is shown made up of a normally stationary front positive component consisting of lens elements 1 and 2, a movable negative middle component consisting of lens elements 3 and 4 cemented together, and a positive movable rear component consisting of a single lens element 5. By normally stationary lens is meant a lens component which is stationary insofar as the zooming adjustment is concerned but which may be movable for focusing to various object distances. This zoom converter is mounted in front of a standard photographic objective 6 shown in outline; for example, in front of a standard 13 mm. f./1.9 objective covering a field of ±13° for an 8 mm. movie camera.

FIG. 2 is a table of data of a specific embodiment of the invention. This table is repeated as follows:

| Lens | N | V | Radii, mm. | Thickness, mm. |
|---|---|---|---|---|
| 1 | 1.720 | 29.3 | $R_1 = +42.22$ | $t_1 = 2.00$ |
| 2 | 1.616 | 49.5 | $R_2 = +20.40$ | $t_2 = 12.01$ |
| | | | $R_3 = -215.7$ | $s_1$ varies |
| 3 | 1.720 | 29.3 | $R_4 = -200.0$ | $t_3 = 3.30$ |
| 4 | 1.697 | 56.2 | $R_5 = -25.00$ | $t_4 = 2.00$ |
| | | | $R_6 = +16.70$ | $s_2$ varies |
| 5 | 1.511 | 64 | $R_7 = \infty$ | $t_5 = 2.00$ |
| | | | $R_8 = -34.04$ | $s_3$ varies |

In this table as in FIG. 2 the overall-length L of the zoom converter measured from the front lens surface of the front lens element 1 to the rear lens surface of the rear element 5 is 55.25 mm. when the converter is set for unit magnification. This total length becomes less than 55.25 at all magnifications greater or less than unity. In any afocal converter, the linear dimensions can be changed uniformly to any desired size but the ratio of each radius or thickness to the over-all length L remains the same. The greater the dimensions are made, the better the aberration correction but the less is the convenience of use. The lens elements are numbered in the first column in order from front to rear, the refractive index N of the glass for the D line of the spectrum and the conventional dispersive index V are given in the second and third columns, respectively, the radii of curvature R of the lens surfaces are given in the fourth column and the thicknesses $t$ of the lens elements in the last column, each numbered by subscript from front to rear. The airspaces $s_1$, $s_2$, $s_3$ are variable and are given for a series of magnifications from 0.65 to 1.9 in the following auxiliary table:

| Magnification | $s_1$ | $s_2$ | $s_3$ |
| --- | --- | --- | --- |
| | mm. | mm. | mm. |
| 0.65 | 0.54 | 28.64 | 16.76 |
| 0.80 | 7.16 | 25.39 | 13.40 |
| 1.00 | 12.89 | 21.05 | 12.00 |
| 1.25 | 17.48 | 15.62 | 12.84 |
| 1.56 | 21.13 | 8.89 | 15.92 |
| 1.90 | 23.76 | 1.51 | 20.67 |

Thus $s_1$ varies between 04.54 and 23.76 mm. which is between 0.01L and 0.43L. $s_2$ varies between 28.64 and 1.51 mm. which is between 0.52L and 0.027L. At magnification 1.00, $s_1$ equals 12.89 which is 0.23L and $s_2$ equals 21.05 which is 0.38L.

$s_3$ is a nominal figure since it may be increased or decreased by a constant amount when one objective is substituted for another, but it is useful in determining the shape of the cam or other means of movement of the rear positive component of the converter.

In mounting the movable components for movement according to this rule, a smooth curve is drawn through these points and the movement of the two movable components is co-ordinated by cam means in any known manner or preferably by a combined crank and cam means described in a copending application Serial No. 855,415, filed November 25, 1959, by William A. Martin, so as to hold the spaces in the relation given by the points. Also, the airspace $s_3$ is long enough in this specific example to accommodate a partially transparent mirror for diverting a portion of the incident light upward or aside for a viewfinder beam in any known manner or in particular in the manner described in another copending application, Serial No. 855,402, filed November 25, 1959, by Martin and Brown.

It will be noted that the middle component moves from front to rear as the magnification is increased while the rear component, as indicated by the variation in the space $s_3$, moves first from the front to the rear and then from the rear toward the front again, moving farther to the front at the higher magnification end of the range than at the low magnification end. At the most rearward position, the over-all length of the attachment from surface $R_1$ to surface $R_8$ is 55.25 mm. and at this setting the spacing $s_3$ is 12.00 mm.

This particular example was designed with this 67.25 mm. distance from the front of the attachment to the front of the main objective for use with an objective of 13 mm. focal length and when so made up, the focal length of the entire combination of zoom converter and objective ranges from 8.6 mm. to about 25.0 mm.

FIG. 3 is a graph showing the range of movement of the two movable components. At the left end of the graph the scale of magnification is set forth and along the bottom of the graph is a linear scale, the first curve 31 indicating the variation in the front airspace $s_1$ and the second curve 32 indicating the variation in the sum of the first two airspaces ($s_1+s_2$) which indicates the position of the third component with the addition of a constant corresponding to the thickness of the second component.

A zoom converter according to the above specification performs very satisfactorily.

Another example of a lens attachment according to this invention is shown in the following table where the symbols used have the same meaning as before:

| Lens | N | V | Radii, mm. | Thickness mm. |
| --- | --- | --- | --- | --- |
| 1 | 1.720 | 42.0 | $R_1=+38.02$ | $t_1=3.60$ |
| | | | $R_2=+16.90$ | |
| 2 | 1.620 | 60.3 | | $t_2=8.77$ |
| | | | $R_3=-187.7$ | |
| | | | | $s_1$ varies |
| | | | $R_4=-180.2$ | |
| 3 | 1.720 | 29.3 | | $t_3=2.97$ |
| | | | $R_5=-22.48$ | |
| 4 | 1.697 | 56.2 | | $t_4=1.99$ |
| | | | $R_6=+15.05$ | |
| | | | | $s_2$ varies |
| | | | $R_7=\infty$ | |
| 5 | 1.511 | 63.5 | | $t_5=1.80$ |
| | | | $R_8=-30.68$ | |
| | | | | $s_3=4.45$ |

The airspaces $s_1$ and $s_2$ are variable and are given for a series of magnifications from 0.65 to 1.9 in the following auxiliary table:

| Magnification | $s_1$, mm. | $s_2$, mm. |
| --- | --- | --- |
| 0.65 | 0.27 | 25.83 |
| 0.80 | 6.24 | 22.88 |
| 1.00 | 11.29 | 18.98 |
| 1.25 | 15.52 | 14.08 |
| 1.56 | 18.80 | 8.02 |
| 1.90 | 21.17 | 1.37 |

The overall length of the attachment at unit magnification is 49.50 mm., which is L. At unit magnification $s_1$ equals 0.23L and $s_2$ equals 0.38L. $s_1$ varies between 0.27 and 21.17 mm. which is between 0.005L and 0.43L. $s_2$ varies between 25.83 and 1.37 mm. which is between 0.52L and 0.027L.

This example has even less distortion and less change in distortion as magnification is changed than the example of FIG. 2, although the one shown in FIG. 2 is quite satisfactory.

In each of the examples the front component has its negative element placed in front of its positive element. This arrangement, rather than the reverse, when used in the present invention, permits the attainment through proper choice of glasses, powers and bending, of unusually good correction for spherical aberration, astigmatism and lateral color throughout the zoom range.

In either embodiment the front component of the attachment may be "normally stationary" i.e. fixed relative to the main objective, as shown in FIGS. 1, 2 and 3. Having the front lens stationary has advantages, such as convenience of focusing by adjusting the fixed member.

As an alternative, the rear component may be the "normally stationary" one. The main advantage is the fact that a minimum size of rear component is then permissible since it stays near the main objective and does not tend to vignette as a small lens would if moved far from the main objective. However, the "fixed-front" embodiment is not objectionable in this connection since the rear component moves only a short distance anyway. A second advantage of the "fixed-rear" embodiment arises from the fact that in all cases $s_2$ varies linearly with effective focal length and hence if one wants "linear" zooming, one simply moves the middle component linearly relative to the main objective (the front component moving forth and back). However "linear" zooming is not particularly desirable; geometric progression is probably preferable.

As still another alternative, the negative middle component of the attachment could be the normally stationary one and both positive components could be moved. This seems to have no advantage and has several disadvantages including the extended excursion which must be made by the rear component and the resultant need for a large rear component to prevent vignetting.

Similarly systems having all three components movable would have no advantages and many disadvantages.

Thus the preferred embodiments of the present invention have one or other of the positive components "normally stationary."

The invention has been described in detail with particular reference to preferred embodiments thereof, but it will be understood that variations and modifications can be effected within the spirit and scope of the invention as described hereinabove and as defined in the appended claims.

What I claim is:

1. An afocal zoom lens converter attachment for mounting in front of a photographic objective, comprising a front positive member, a middle negative member and a rear positive member all coaxially mounted, one of the positive members being normally stationary, the middle and the other positive member being movable and being mechanically coupled so that the system is substantially afocal at all settings of the two movable members, characterized by the front member consisting of a front negative meniscus element and a positive biconvex element cemented to the back thereof, by the middle member consisting of a front positive meniscus element and a negative biconcave element cemented to the back thereof, and by the rear member consisting of a single positive element, in which five elements the refractive indices N for the D line of the spectrum, and the radii of curvature R of the lens surfaces each numbered by subscripts from front to rear are as follows:

| | |
|---|---|
| $1.67 < N_1 < 1.77$ | $0.58L < R_1 < 1.12L$ |
| $0.5V_2 < V_1 < 0.7V_2$ | $0.31L < R_2 < 0.44L$ |
| $1.57 < N_2 < 1.67$ | $-0.66 < \dfrac{L}{R_3} < 0$ |
| $40 < V_2 < 65$ | |
| $1.67 < N_3 < 1.77$ | $-0.69 < \dfrac{L}{R_4} < 0$ |
| $0.4V_4 < V_3 < 0.6V_4$ | $0.38L < -R_5 < 0.56L$ |
| $1.65 < N_4 < 1.75$ | $0.27L < +R_6 < 0.34L$ |
| $45 < V_4 < 65$ | |
| $1.46 < N_5 < 1.56$ | $-0.41 < \dfrac{L}{R_7} < +0.41$ |
| $55 < V_5 < 100$ | $0.48L < -R_8 < 0.83L$ | where L is the distance measured from the front lens surface of the front member to the rear lens surface of the rear member of the converter when the converter is set for unit magnification.

2. An afocal zoom lens converter attachment for mounting in front of a photographic objective, comprising a front positive member, a middle negative member and a rear positive member all coaxially mounted, one of the positive members being normally stationary, the middle and the other positive member being movable and being mechanically coupled so that the system is substantially afocal at all settings of the two movable members, characterized by the front member consisting of a front negative meniscus element and a positive biconvex element cemented to the back thereof, by the middle member consisting of a front positive meniscus element and a negative biconcave element cemented to the back thereof, and by the rear member consisting of at least a positive element, in which five elements the refractive indices N for the D line of the spectrum, the dispersive indices V, the radii of curvature R of the lens surfaces, the thicknesses $t$ and member spacing $s$ numbered by subscripts from front to rear are as follows:

| Lens | N | V | Radii | Thickness |
|---|---|---|---|---|
| 1 | 1.72 | 29 | $R_1 = +0.77L$ | $t_1 = 0.037L$ |
| 2 | 1.62 | 49 | $R_2 = +0.37L$ | $t_2 = 0.22L$ |
| | | | $R_3 = -3.9L$ | $s_1$ varies between 0.01L and 0.43L |
| 3 | 1.72 | 29 | $R_4 = -3.7L$ | $t_3 = 0.060L$ |
| 4 | 1.70 | 56 | $R_5 = -0.45L$ | $t_4 = 0.037L$ |
| | | | $R_6 = +0.30L$ | $s_2$ varies between 0.52L and 0.027L |
| 5 | 1.51 | 64 | $R_7 = \infty$ | $t_5 = 0.037L$ |
| | | | $R_8 = -0.62L$ | | where L is the distance measured from the front lens surface of the front member to the rear lens surface of the rear member of the converter when the converter is set for unit magnification with $s_1 = 0.23L$ and $s_2 = 0.38L$.

3. An afocal zoom lens converter attachment for mounting in front of a photographic objective, comprising a front positive member, a middle negative member and a rear positive member all coaxially mounted, one of the positive members being normally stationary relative to the objective, the middle and the other of the positive members being movable and being mechanically coupled so that the system is substantially afocal at all settings of the two movable members, characterized by the front member consisting of a front negative meniscus element and a positive biconvex element cemented to the back thereof, by the middle member consisting of a front positive meniscus element and a negative biconcave element cemented to the back thereof, and by the rear member consisting of at least a positive element, in which five elements the refractive indices N for the D line of the spectrum, the dispersive indices V, the radii of curvature R of the lens surfaces, the thicknesses $t$ and member spacing $s$ numbered by subscripts from front to rear are as follows:

| Lens | N | V | Radii | Thickness |
|---|---|---|---|---|
| 1 | 1.72 | 42 | $R_1 = +0.77L$ | $t_1 = 0.07L$ |
| 2 | 1.62 | 60 | $R_2 = +0.34L$ | $t_2 = 0.18L$ |
| | | | $R_3 = -3.8L$ | $s_1$ varies between 0.005L and 0.43L |
| 3 | 1.72 | 29 | $R_4 = -3.7L$ | $t_3 = 0.06L$ |
| 4 | 1.70 | 56 | $R_5 = -0.45L$ | $t_4 = 0.04L$ |
| | | | $R_6 = +0.30L$ | $s_2$ varies between 0.52L and 0.027L |
| 5 | 1.51 | 64 | $R_7 = \infty$ | $t_5 = 0.04L$ |
| | | | $R_8 = -0.62L$ | | where L is the distance measured from the front lens surface of the front member to the rear lens surface of the rear member of the converter when the converter is set for unit magnification with $s_1 = 0.23L$ and $s_2 = 0.38L$.

References Cited in the file of this patent

UNITED STATES PATENTS

| 2,663,223 | Hopkins | Dec. 22, 1953 |
| 2,778,272 | Reymond | Jan. 22, 1957 |
| 2,844,996 | Klemt | July 29, 1958 |

FOREIGN PATENTS

| 1,173,921 | France | Nov. 3, 1958 |